United States Patent
Lee et al.

(10) Patent No.: US 12,107,289 B2
(45) Date of Patent: Oct. 1, 2024

(54) BATTERY MODULE AND BATTERY PACK INCLUDING THE SAME

(71) Applicant: LG ENERGY SOLUTION, LTD., Seoul (KR)

(72) Inventors: Hyunjae Lee, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 526 days.

(21) Appl. No.: 17/437,178

(22) PCT Filed: Jun. 30, 2020

(86) PCT No.: PCT/KR2020/008520
§ 371 (c)(1),
(2) Date: Sep. 8, 2021

(87) PCT Pub. No.: WO2021/071056
PCT Pub. Date: Apr. 15, 2021

(65) Prior Publication Data
US 2022/0173467 A1 Jun. 2, 2022

(30) Foreign Application Priority Data
Oct. 10, 2019 (KR) ........................ 10-2019-0125310

(51) Int. Cl.
*H01M 50/244* (2021.01)
*H01M 50/209* (2021.01)
(Continued)

(52) U.S. Cl.
CPC ....... *H01M 50/244* (2021.01); *H01M 50/209* (2021.01); *H01M 50/211* (2021.01);
(Continued)

(58) Field of Classification Search
None
See application file for complete search history.

(56) References Cited

U.S. PATENT DOCUMENTS

| 10,658,716 B2 | 5/2020 | Lee et al. |
| 2010/0178548 A1 | 7/2010 | Baek |

(Continued)

FOREIGN PATENT DOCUMENTS

| CN | 101777664 A | 7/2010 |
| CN | 107150581 A | 9/2017 |

(Continued)

OTHER PUBLICATIONS

Machine Translation of KR-20170082041-A (Year: 2017).*
(Continued)

*Primary Examiner* — Gregg Cantelmo
(74) *Attorney, Agent, or Firm* — Birch, Stewart, Kolasch & Birch, LLP (57) ABSTRACT

A battery module includes a battery cell stack, in which a plurality of battery cells are stacked, a module frame configured to accommodate the battery cell stack, and of which a front surface and a rear surface facing each other are opened, and an end plate configured to cover each of the front surface and the rear surface of the module frame, wherein the module frame includes a first bonding surface formed at edges constituting each of the front surface and the rear surface, and wherein the end plate include a second bonding surface bonded to the first bonding surface, and a rib located toward the center of the end plate than the second bonding surface and protruding toward the module frame.

14 Claims, 9 Drawing Sheets

(51) Int. Cl.
  *H01M 50/211* (2021.01)
  *H01M 50/224* (2021.01)
  *H01M 50/242* (2021.01)
  *H01M 50/262* (2021.01)
  *H01M 50/271* (2021.01)
  *H01M 50/276* (2021.01)

(52) U.S. Cl.
  CPC ....... *H01M 50/224* (2021.01); *H01M 50/242* (2021.01); *H01M 50/262* (2021.01); *H01M 50/271* (2021.01); *H01M 50/276* (2021.01)

(56) References Cited

U.S. PATENT DOCUMENTS

| | | | |
|---|---|---|---|
| 2010/0310922 A1* | 12/2010 | Villarreal | H01M 50/503 429/160 |
| 2013/0130073 A1* | 5/2013 | Kim | H01M 50/60 429/61 |
| 2014/0186677 A1* | 7/2014 | Lim | H01M 10/6556 429/120 |
| 2014/0255758 A1 | 9/2014 | Tsutsumi et al. | |
| 2015/0004469 A1 | 1/2015 | Park et al. | |
| 2015/0024253 A1 | 1/2015 | Noh | |
| 2015/0064522 A1* | 3/2015 | Kim | H01M 50/103 429/72 |
| 2015/0079451 A1* | 3/2015 | Jeong | H01M 50/50 429/151 |
| 2017/0125753 A1 | 5/2017 | Kim et al. | |
| 2017/0288185 A1 | 10/2017 | Maguire | |
| 2018/0138565 A1 | 5/2018 | Lee et al. | |
| 2019/0006647 A1 | 1/2019 | Ryu et al. | |
| 2020/0127250 A1 | 4/2020 | Kim et al. | |
| 2021/0126313 A1 | 4/2021 | Lee et al. | |
| 2022/0166084 A1 | 5/2022 | Park et al. | |

FOREIGN PATENT DOCUMENTS

| | | |
|---|---|---|
| CN | 107785516 A | 3/2018 |
| CN | 207800714 U | 8/2018 |
| CN | 109840777 A | 4/2019 |
| CN | 208848959 U | 5/2019 |
| CN | 208986045 U | 6/2019 |
| CN | 209200033 U | 8/2019 |
| CN | 209374538 U | 9/2019 |
| CN | 210379142 U | 4/2020 |
| EP | 2 819 210 B1 | 10/2017 |
| EP | 3 621 129 A1 | 3/2020 |
| JP | 11-339737 A | 12/1999 |
| JP | 2003-323869 A | 11/2003 |
| JP | 2010-165679 A | 7/2010 |
| JP | 2012-164545 A | 8/2012 |
| JP | 2013-91085 A | 5/2013 |
| JP | 2014-160617 A | 8/2014 |
| JP | 2015-11989 A | 1/2015 |
| JP | 2015-162399 A | 9/2015 |
| JP | 2016-167350 A | 9/2016 |
| JP | 2018-518032 A | 7/2018 |
| JP | 2019-502250 A | 1/2019 |
| KR | 10-2018-0010226 A | 1/2015 |
| KR | 10-2017-0036639 A | 4/2017 |
| KR | 10-2017-0050959 A | 5/2017 |
| KR | 20170082041 A * | 7/2017 |
| KR | 10-2018-0135604 A | 12/2018 |
| KR | 10-2019-0083109 A | 6/2019 |
| WO | 2019/124869 A1 | 6/2019 |
| WO | WO 2019/107764 A1 | 6/2019 |
| WO | WO 2021/010618 A1 | 1/2021 |

OTHER PUBLICATIONS

Extended European Search Report for European Application No. 20875291.5, dated Jul. 6, 2023.
International Search Report (PCT/ISA/210) issued in PCT/KR2020/008520, dated Oct. 8, 2020.

* cited by examiner

FIG. 1

Prior Art

FIG. 2

Prior Art

BATTERY MODULE AND BATTERY PACK INCLUDING THE SAME

CROSS CITATION WITH RELATED APPLICATION(S)

This application claims the benefit of Korean Patent Application No. 10-2019-0125310 filed on Oct. 10, 2019 with the Korean Intellectual Property Office, the disclosure of which is incorporated herein by reference in its entirety

TECHNICAL FIELD

The present disclosure relates to a battery module and a battery pack including the same, and more particularly to a battery module having improved productivity, and a battery pack including the same.

BACKGROUND ART

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly together with an electrolyte.

Generally, the lithium secondary battery may be classified based on the shape of the exterior material into a prismatic secondary battery in which the electrode assembly is embedded in a metal can, and a pouch-type secondary battery in which the electrode assembly is embedded in a pouch of an aluminum laminate sheet.

Small-sized mobile devices use one to three battery cells for each device, whereas middle- or large-sized devices such as vehicles require high power and large capacity. Therefore, a middle- or large-sized battery module having a plurality of battery cells electrically connected to one another is used.

The middle- or large-sized battery module is preferably manufactured so as to have as small a size and weight as possible. Consequently, a prismatic battery or a pouch-shaped battery, which can be stacked with high integration and has a small weight relative to capacity, is usually used as a battery cell of the middle- or large-sized battery module.

Meanwhile, in order to protect the cell stack from external shock, heat, or vibration, the battery module may include a module frame which accommodates the battery cell stack in an internal space.

Figure 1:
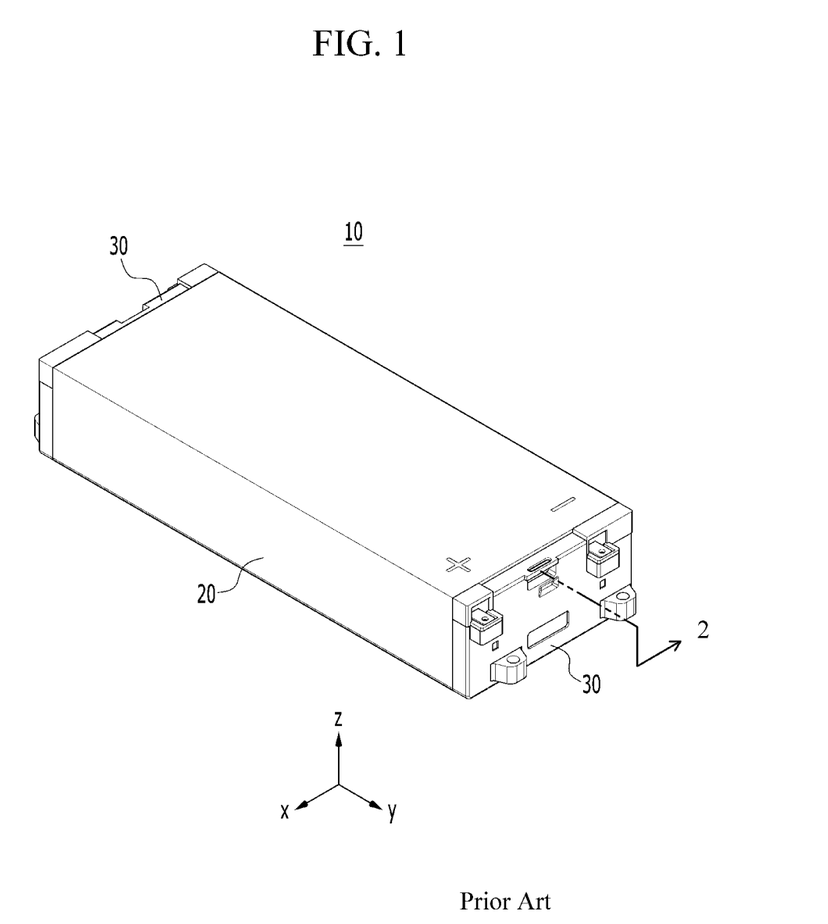
FIG. 1 is a perspective view illustrating a battery module according to the related art.

FIG. 1 is a perspective view illustrating a battery module 10 according to the related art.

Referring to FIG. 1, the battery module 10 of the related art may include a module frame 20 accommodating a battery cell stack in the interior thereof and end plates 30 covering an opened front surface (Y-axis direction) and the other surface (the opposite direction of Y-axis) of the module frame 20.

Figure 2:
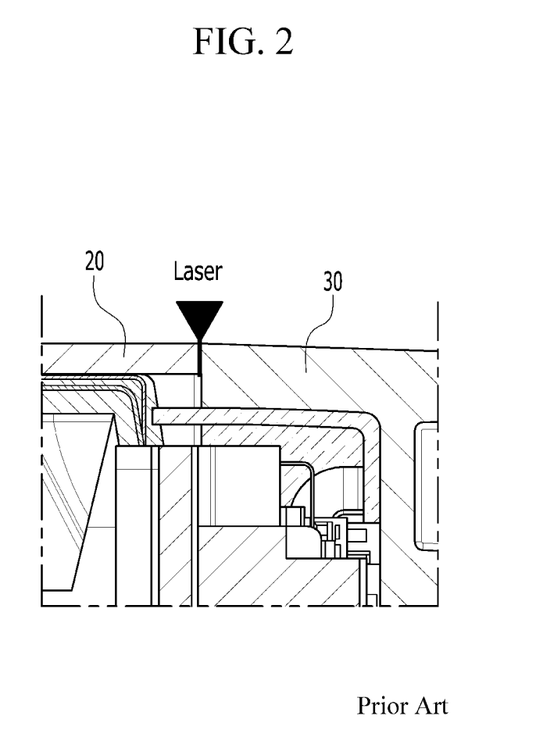
FIG. 2 is a cross-sectional view illustrating a part of a cross-section taken along cutting line 2 of FIG. 1.

FIG. 2 is a cross-sectional view illustrating a part of a cross-section taken along cutting line A of FIG. 1.

Referring to FIG. 2, in order to bond the module frame 20 and the end plate 30, welding is performed on the bonding surface in a state where the module frame 20 and the end plate 30 are located to face each other.

In this case, for the welding, it is necessary to fix the module frame 20 and the end plate 30 so that the bonding surfaces of the module frame 20 and the end plate 30 are located so as to correspond to each other. However, there is a limit to the fixation of the module frame 20 and the end plate 30 to closely correspond to each other, which causes a problem that the welding is not smoothly performed.

In addition, a laser welding may be performed for the welding, but either the laser itself passing therethrough during a welding process or weld spatters may cause damage to the internal components, including the battery cells.

Therefore, there is a need for a technology capable of solving this problem of the prior art.

DETAILED DESCRIPTION OF THE INVENTION

Technical Problem

Embodiments of the present disclosure have been designed in an effort to solve the above-mentioned problems, and an object thereof is to provide a battery module which improves the efficiency of temporary assembly of a module frame and an end plate, and can protect internal components during welding, and a battery pack including the same.

However, the problem to be solved by the embodiments of the present disclosure is not limited to the above-described problems, and can be variously expanded within the scope of the technical idea included in the present disclosure.

Technical Solution

The battery module according to an embodiment of the present disclosure may include a battery cell stack, in which a plurality of battery cells are stacked, a module frame configured to accommodate the battery cell stack, and having an opened front surface and an opened rear surface facing each other are opened, and an end plate configured to cover each of the front surface and the rear surface of the module frame, wherein the module frame includes a first bonding surface formed at edges constituting each of the front surface and the rear surface, and wherein the end plate includes a second bonding surface bonded to the first bonding surface, and a rib located toward the center of the end plate than the second bonding surface and protruding toward the module frame.

The rib may be integrally formed with the end plate.

The rib may extend along a direction that is parallel to the edges of the end plate.

A chamfer for assembling efficiency of the end plate and the module frame may be formed in the rib.

The chamfer may be formed at an edge making contact with an inside surface of the module frame, among the edges of the rib.

The rib may be located to be adjacent to the first bonding surface and the second bonding surface.

The first bonding surface and the second bonding surface may be weld coupled-welded to each other.

The thickness of the rib located at an upper edge of the edges of the end plate may be different from the thickness of the rib located at a lower edge of the edges of the end plate.

A rib groove may be formed on a side surface of the rib, a rib groove locking portion inserted into the rib groove may be formed in the module frame, and the rib groove locking portion may be coupled to the rib groove.

The rib groove locking portion may be located at the inside surface of the module frame and has a triangular cross-section.

The rib groove locking portion may be configured such that a side of the rib groove locking portion closer to the first bonding surface has a slope that is less than a slope of a side of the rib groove locking portion further from the first bonding surface.

The rib groove may be recessed in a shape corresponding to the rib groove locking portion.

The module frame may be a mono frame, of which a top surface, a lower surface, and side surfaces are integrated.

The module frame may include a U-shaped frame, of which a top surface is opened, and a top cover configured to cover the opened top surface of the U-shaped frame.

Advantageous Effects

According to the embodiments of the present disclosure, the temporary assembly efficiency of the module frame and the end plate can be improved through the rib formed at the end plate prior to the welding.

In addition, the rib can prevent the laser passing therethrough or the weld spatter from damaging the internal components.

DETAILED DESCRIPTION OF THE EMBODIMENTS

Hereinafter, various embodiments of the present disclosure will be described in detail with reference to the accompanying figures so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

Figure 3:
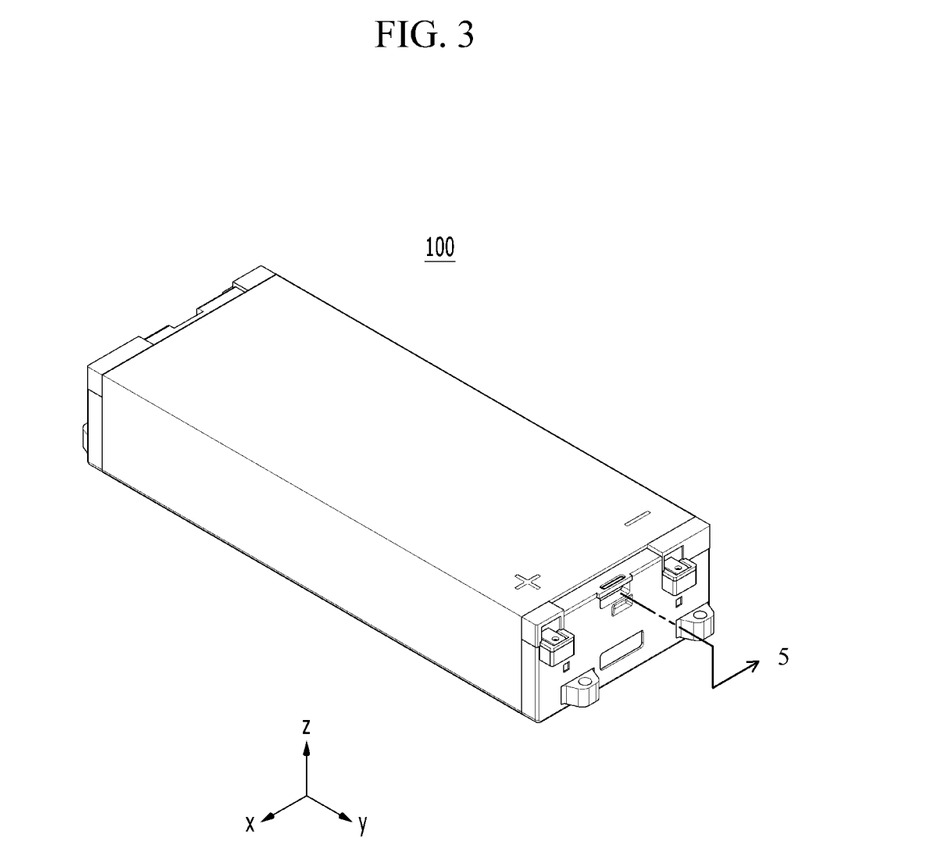
FIG. 3 is a perspective view illustrating a battery module according to an embodiment of the present disclosure.
Figure 4:
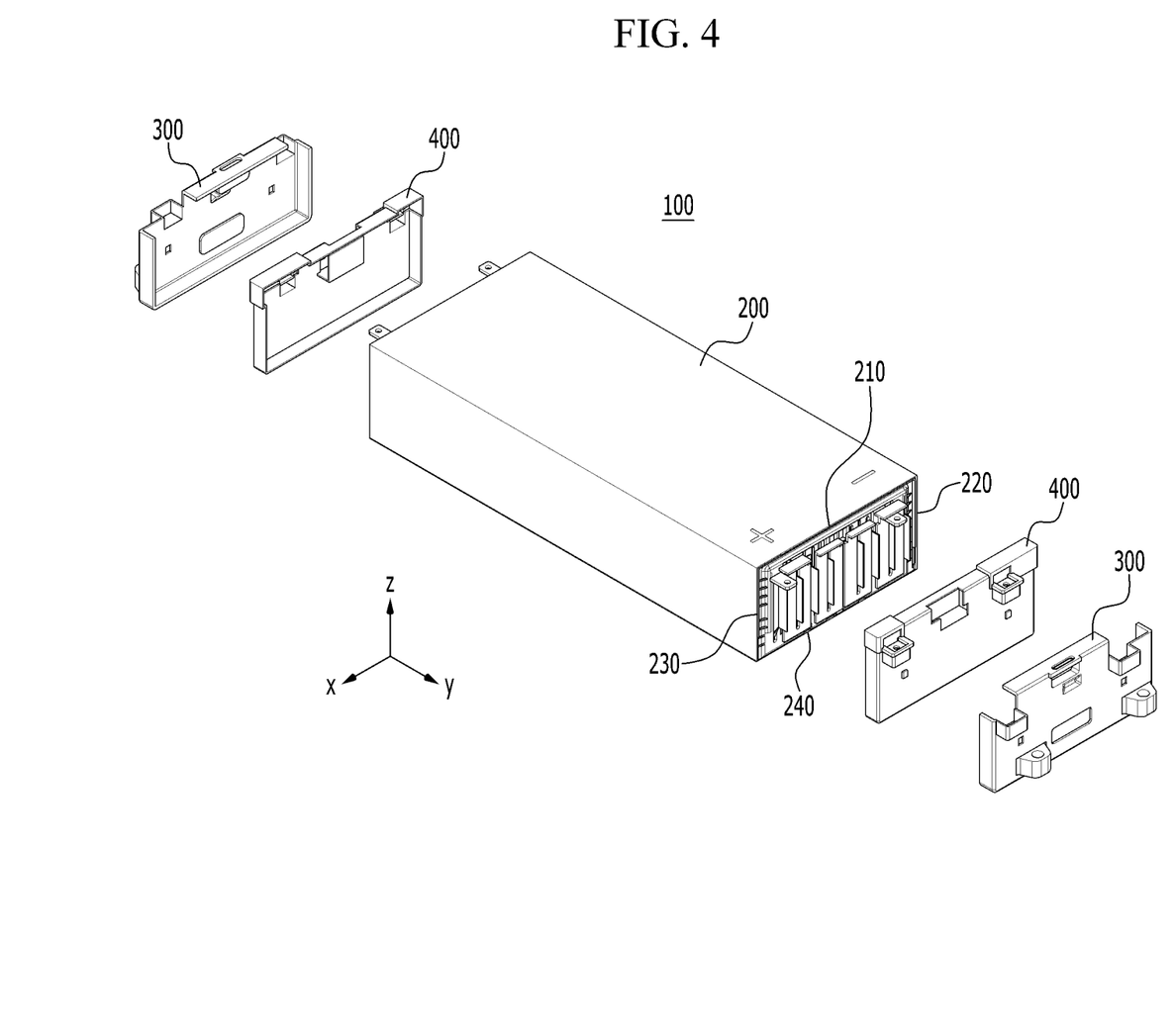
FIG. 4 is an exploded perspective view illustrating the battery module of FIG. 3.

FIG. 3 is a perspective view illustrating a battery module 100 according to an embodiment of the present disclosure, and FIG. 4 is an exploded perspective view illustrating the battery module 100 of FIG. 3.

Referring to FIGS. 3 and 4, a battery module 100 of the present embodiment includes a battery cell stack, a module frame 200 configured to accommodate the battery cell stack, and of which a front surface (Y-axis direction) and a rear surface (the opposite direction of Y-axis) facing each other are opened, and an end plate 300 configured to cover each of the front surface and the rear surface of the module frame 200.

Although not illustrated in FIG. 4 in detail, the battery cell stack is a structure, in which a plurality of battery cells are stacked, and is accommodated in the module frame 200.

The module frame 200 is a structure in which the front surface and the rear surface, which face each other are opened, and can protect the battery cell stack from the outside.

The end plate 300 can cover the front surface and the rear surface of the module frame 200 to protect an electrode lead or a busbar. In this case, the end plate 300 may be a metal plate having a predetermined strength, and in order to prevent the end plate 300 from making contact with the electrode lead or the busbar and thus causing a risk, such as a short circuit, an insulation member 400 may be interposed between the battery cell stack and the end plate 300.

Figure 5:
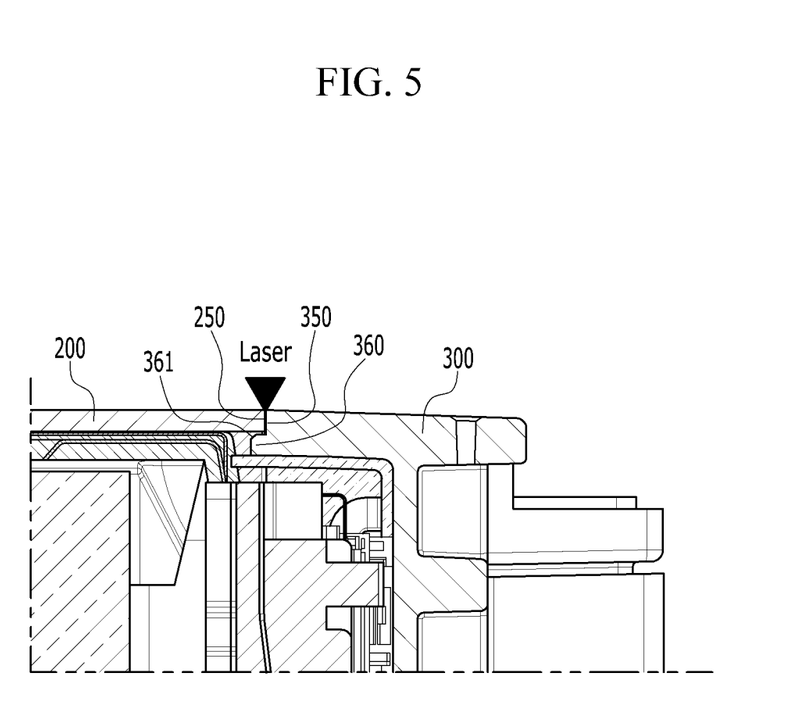
FIG. 5 is a cross-sectional view illustrating a part of a cross-section taken along cutting line 5 of FIG. 3.

FIG. 5 is a cross-sectional view illustrating a part of a cross-section taken along cutting line B of FIG. 3.

Referring to FIG. 5 together with FIG. 4, a first bonding surface 250 of the module frame 200 and a second bonding surface 350 of the end plate 300 are welded in a state of being in contact with each other, and the end plate 300 is bonded to the module frame 200.

The first bonding surface 250 is located at edges 210, 220, 230, and 240, which constitute the front surface (Y-axis direction) and the rear surface (the opposite direction of Y-axis) of the module frame 200. The second bonding surface 350 is provided to correspond to the first bonding surface 250 at the edges of the end plate 300, and the first bonding surface 250 and the second bonding surface 350 are bonded to each other through welding. That is, the first bonding surface 250 and the second bonding surface 350 are weld-coupled to each other.

The welding method is not limited, but it is preferable to perform a laser welding.

However, if a laser beam is shot for welding, the laser beam may pass through the module frame 200 and the end plate 300 to cause damage to the battery cell stack or the other internal components. In addition, during welding process, a weld spatter phenomenon, in which welding flame is scattered in all directions, occurs and the welding spatter may also damage the battery cell stack or the other internal components.

Accordingly, the end plate 300 of the present embodiment includes a rib located toward the center of the end plate 300 than the second bonding surface 350 and protruding toward the module frame 200.

The rib 360 extends along a direction parallel to the edges of the end plate 300, and may prevent the transmitted laser beam or the weld spatter from affecting the battery cell stack or the other internal components.

Moreover, it is preferable that the module frame 200 and the end plate 300 are welded in a fixed state so as to correspond to each other in a specific location. In the present embodiment, when the end plate 300 is coupled to the module frame 200, the rib 360 is inserted into the interior space of the module frame 200, so that the end plate 300 can be coupled in the correct location without any misalignment. That is, the rib 360 functions to improve temporary assembly efficiency between the module frame 200 and the end plate 300.

In addition, even in the process of welding, the end plate 300 may be fixed to a specific location due to the rib 360.

The rib 360 has to be located adjacent to the first bonding surface 250 and the second bonding surface 350 as illustrated in FIG. 5, so that it may be effective in preventing the end plate 300 from deviating therefrom or fixing the end plate 300.

Additionally, the rib 360 structure can prevent a distortion in a weld area due to the generated heat, and even if a slight distortion occurs, the rib 360 structure may prevent a distortion or a protrusion in the weld area from affecting the battery cell stack or the other internal components.

Figure 6:
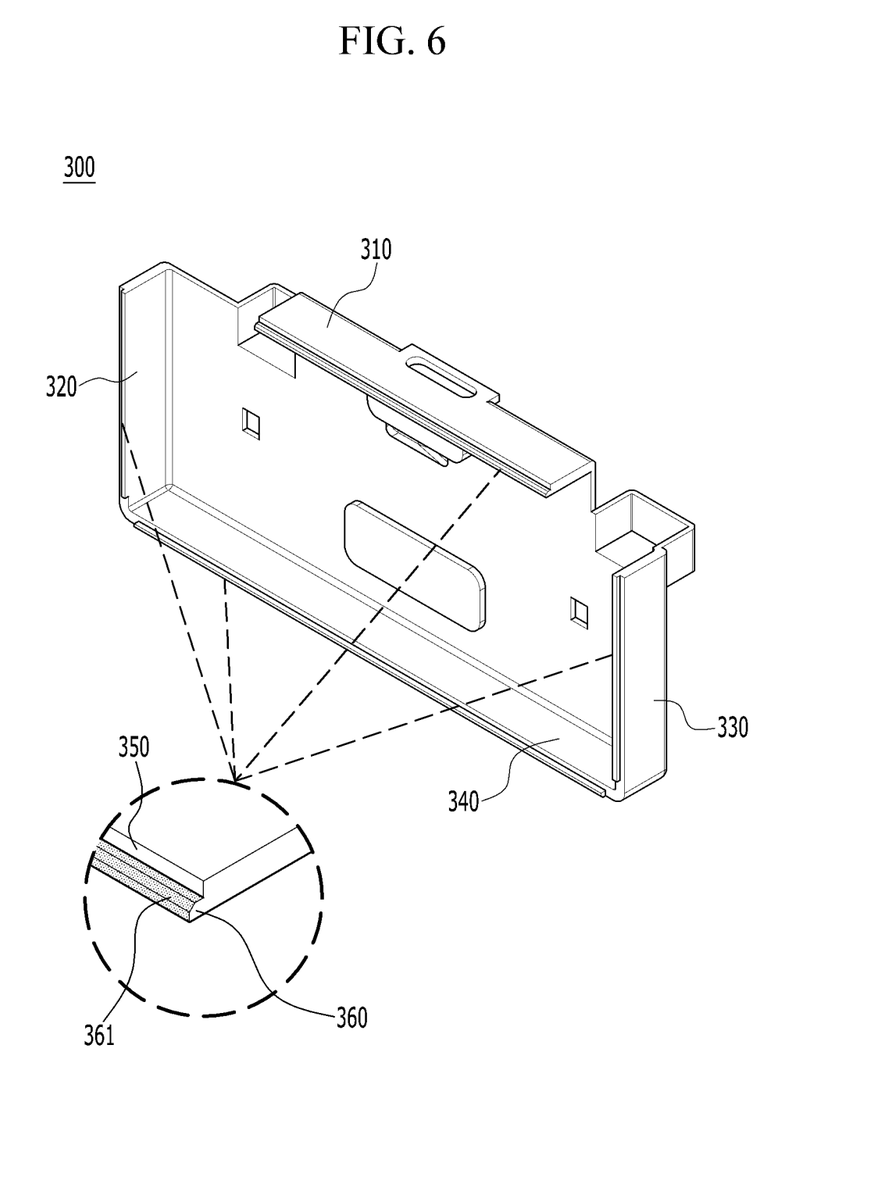
FIG. 6 is a perspective view illustrating an end plate of FIG. 4.

FIG. 6 is a perspective view illustrating end plate 300 of FIG. 4.

Referring to FIG. 6, the second bonding surfaces 350 are located at four edges 310, 320, 330, and 340 of the end plate 300, which correspond to four edges 210, 220, 230, and 240 of the module frame 200 in FIG. 4, respectively.

The ribs 360 are located toward the center of the end plate 300 than the second bonding surfaces 350.

The rib 360 may be formed at at least one site of the four edges 310, 320, 330, and 340 of the end plate 300, but it is preferable that the rib 360 is formed at all of the four edges 310, 320, 330, and 340 as illustrated in FIG. 6. This is because it has to be formed at all of four edges 310, 320, 330, and 340 to effectively achieve the proper position or fixation of the above-described end plate 300.

In addition, the rib 360 extends along a direction parallel to one of the four edges 310, 320, 330, and 340 of the end plate 300.

Meanwhile, the rib 360 may be integrated with the end plate 300, and the end plate 300 including the rib 360 may be manufactured by molding processing. As the preset rib-shaped plate is not bonded, a separate bonding process is not required.

In addition, the thickness of the rib 360 for each of an upper edge 310, a lower edge 340, and both side edges 320 and 330 may be differently set, and thus degree of freedom improves. In particular, among the edges 310, 320, 330, and 340 of the end plate 300, the thicknesses of the rib 360 located at the upper edge 310 and the rib 360 located at the lower edge 340 may be different from each other.

In detail, in order to secure a clearance for interference between other components of the interior of end plate 300 and the rib 360 or a close range section, the sizes of rib 360, especially thicknesses, need to be differently set, respectively. In this case, according to the present disclosure, since the preset rib-shaped plate is not bonded, it is more free to change the rib 360 and easier to take the weld range large or small.

In the case of molding processing, the degree of freedom in the shape of the end plate 300 manufactured is large, and thus a chamfer structure or a rib groove structure described hereinafter is easily implemented. In addition, it can be manufactured with a thinner thickness as compared with extrusion molding.

Meanwhile, referring to FIGS. 5 and 6 together, a chamfer 361 for improving the assembling efficiency of the end plate 300 and the module frame 200 may be formed in the rib 360. In detail, the chamfer 361 may be formed at an edge making contact with an inside surface of the module frame 200, among the edges of the rib 360.

As mentioned above, the ribs 360 may be located to be adjacent to the first bonding surface 250 and the second bonding surface 350, which may make it difficult to insert the ribs 360 into the interior space of the module frame 200. The chamfer 361 can prevent this and improve the assembling efficiency of the end plate 300 and the module frame 200.

Figure 7:
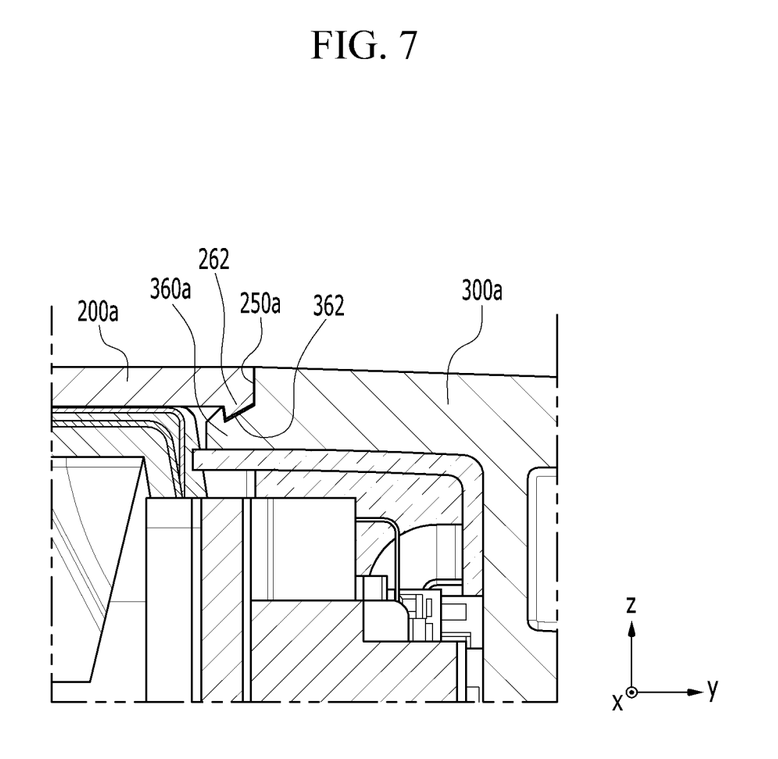
FIG. 7 is a cross-sectional view illustrating the battery module including a rib groove and a rib groove locking portion.

FIG. 7 is a modified embodiment and a cross-sectional view illustrating the battery module including a rib groove and a rib groove locking portion.

Referring to FIG. 7, a rib groove 362 may be formed on a side surface of the rib 360a, a rib groove locking portion 262 inserted into the rib groove 362 may be formed in the module frame 200a, and the rib groove locking portion 262 may be locked and coupled to the rib groove 362.

In order to be locked and coupled, the rib groove 362 may be recessed in a shape corresponding to the rib groove locking portion 262.

The rib groove locking portion 262 is locked and coupled to the rib groove 362, so that the coupling between an end plate 300a and a module frame 200a may be further strengthened. This can improve the temporary assembly efficiency of the end plate 300a prior to welding, and prevent the end plate 300a from deviating therefrom during welding.

The rib groove locking portion 262 may be located on the inside surface of the module frame 200a to form a triangular cross-section.

Further, the slope of the rib groove locking portion 262 may be differently set depending on the direction. In detail, in the rib groove locking portion 262, the slope of the direction (Y-axis direction) in which a first bonding surface 250a is located may be gently and relatively set, so that the end plate 300a may be easily inserted, and the slope in a direction that is opposite to the direction (opposite direction of Y-axis) in which a first bonding surface 250a is located may be relatively rapidly set to strengthen the coupling between the end plate 300a and the module frame 200a.

Figure 8:
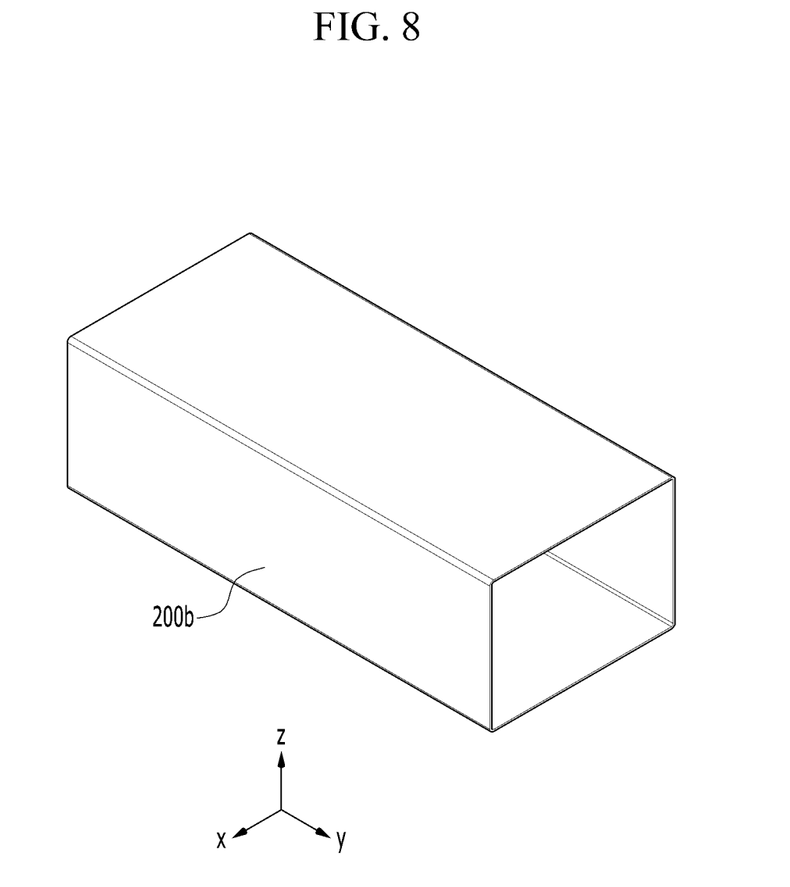
FIG. 8 is a perspective view illustrating a mono frame.
Figure 9:
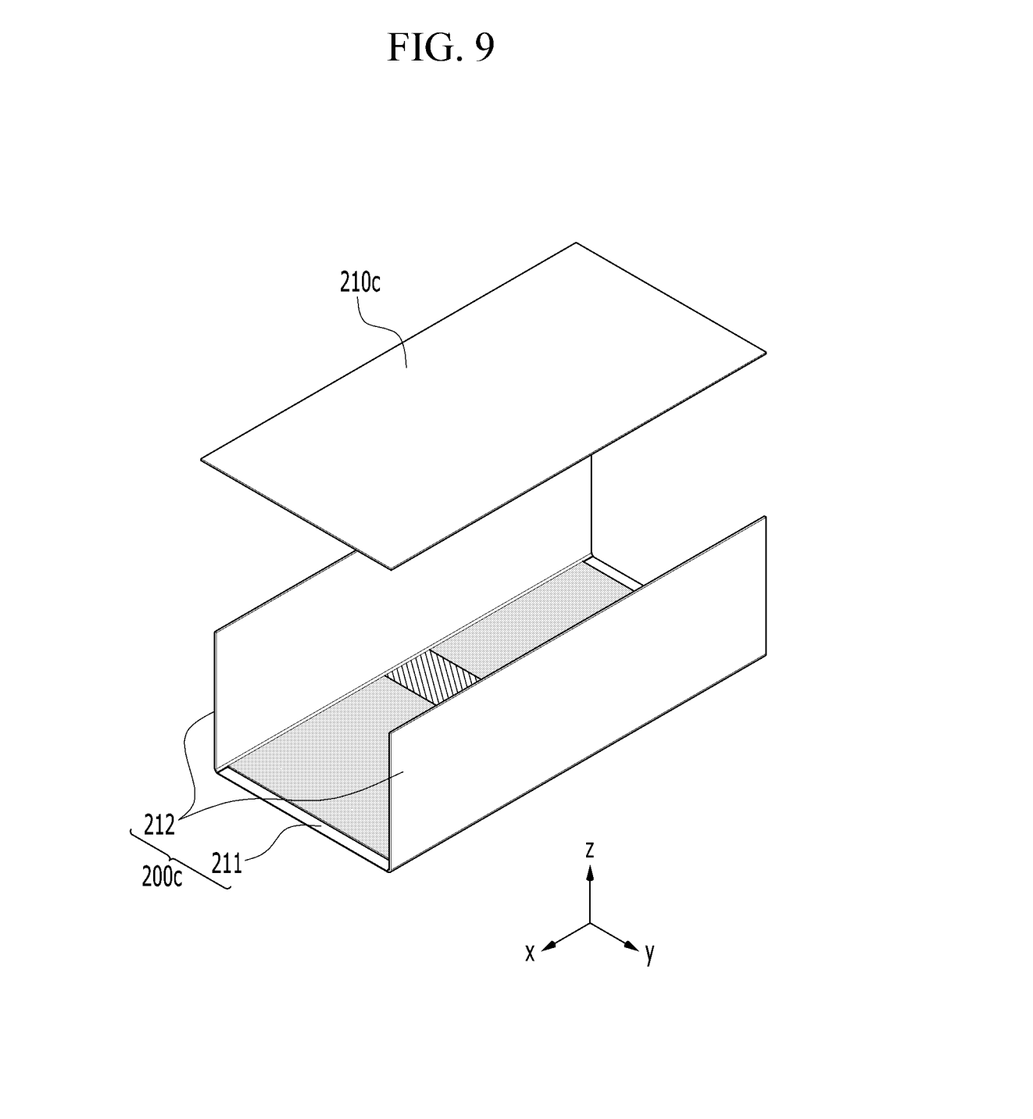
FIG. 9 is a perspective view illustrating a U-shaped frame and a top cover.

Meanwhile, the module frame 200 of the the present disclosure may be a mono frame and a U-shaped frame. FIGS. 8 and 9 illustrate this, FIG. 8 is a perspective view illustrating the mono frame 200b, and FIG. 9 is a perspective view illustrating the U-shaped frame 200c and a top cover 210c. Illustrations of the other configurations are omitted for convenience of description.

First, referring to FIG. 8, the module frame of the present disclosure may be the mono frame 200b.

The mono frame 200b may have a metal plate structure, in which a front surface (Y-axis direction) and a rear surface (the opposite direction of the Y-axis) thereof are opened, and a top surface (Z-axis direction), a lower surface (the opposite direction of Z-axis), and both side surfaces (X-axis direction and the opposite direction thereof) are integrated. The above-mentioned end plates 600 are coupled to the opened the front surface and the rear surface of the mono frame 200b.

Next, referring to FIG. 9, the module frame of the present disclosure may include the U-shaped frame 200c and the top cover 210c.

The U-shaped frame 200c may have a structure, in which a front surface (X-axis direction), a rear surface (the opposite direction of X-axis), and a top surface (Z-axis direction) are opened, and a bottom part 211 and both side surface parts 212 extending upwards from both ends of the bottom part 211, which face each other, are provided.

The top cover 210c may be coupled to the opened top surface of the U-shaped frame 200c, and the above-mentioned end plates may be coupled to the opened front surface and rear surface of the U-shaped frame 200c, respectively.

The U-shaped frame 200c may be coupled to the top cover 210c through welding coupling.

Meanwhile, the module frame 200 and the end plate 300 are preferably a metal plate material having a predetermined strength, especially, it is preferable to include an aluminum alloy. In more detail, the module frame 200 may include Al—Mg—Si-based alloys such as Al 5052 or Al—Mg—Si-based alloys such as Al 6063, and the end plate 300 may include Al—Si—Cu-based alloys such as ADC12 alloys, or Al—Si-based alloys having Mg and Mn added thereto such as Silafont-36 alloys.

The above-mentioned one or more battery modules according to the present embodiment can be mounted together with various control and protection systems such as a battery management system (BMS) and a cooling system to form a battery pack.

The battery module or the battery pack can be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200, 200a: module frame
250: first bonding surface
300: end plate
350: second bonding surface
360: rib
361: chamfer
400: insulation member

The invention claimed is:

1. A battery module comprising:
a battery cell stack, in which a plurality of battery cells are stacked;
a module frame configured to accommodate the battery cell stack, and having an opened front surface and an opened rear surface facing each other; and
a front end plate and a rear end plate configured to cover the front surface and the rear surface of the module frame, respectively,
wherein the module frame comprises a first bonding surface formed at edges constituting at least one of the front surface and the rear surface,
wherein at least one end plate of the front end plate and the rear end plate comprises a second bonding surface bonded to the first bonding surface, and a rib located closer to a center of the at least one end plate than the second bonding surface and protruding toward the module frame, and
wherein a thickness of the rib located at an upper edge of the at least one end plate is different from a thickness of the rib located at a lower edge of the at least one end plate.

2. The battery module of claim 1, wherein the rib is integrally formed with the at least one end plate.

3. The battery module of claim 1, wherein the rib extends along a direction that is parallel to the edges of the at least one end plate.

4. The battery module of claim 1, wherein a chamfer for assembling efficiency of the at least one end plate and the module frame is formed in the rib.

5. The battery module of claim 4, wherein the chamfer is formed at an edge making contact with an inside surface of the module frame, among the edges of the rib.

6. The battery module of claim 1, wherein the rib is located to be adjacent to the first bonding surface and the second bonding surface.

7. The battery module of claim 1, wherein the first bonding surface and the second bonding surface are welded to each other.

8. The battery module of claim 1, wherein the module frame is a mono frame, of which a top surface, a lower surface, and side surfaces are integrated.

9. The battery module of claim 1, wherein the module frame comprises a U-shaped frame, of which a top surface is opened, and a top cover configured to cover the opened top surface of the U-shaped frame.

10. A battery pack comprising one or more battery modules of claim 1.

11. A battery module comprising:
- a battery cell stack, in which a plurality of battery cells are stacked;
- a module frame configured to accommodate the battery cell stack, and having an opened front surface and an opened rear surface facing each other; and
- a front end plate and a rear end plate configured to cover each of the front surface and the rear surface of the module frame,
- wherein the module frame comprises a first bonding surface formed at edges constituting at least one of the front surface and the rear surface,
- wherein at least one end plate comprises a second bonding surface bonded to the first bonding surface, and a rib located closer to a center of the at least one end plate than the second bonding surface and protruding toward the module frame, and
- wherein a rib groove is formed on a side surface of the rib, a rib groove locking portion inserted into the rib groove is formed in the module frame, and the rib groove locking portion is coupled to the rib groove.

12. The battery module of claim 11, wherein the rib groove locking portion is located at an inside surface of the module frame and has a triangular cross-section.

13. The battery module of claim 11, wherein the rib groove locking portion is configured such that a side of the rib groove locking portion closer to the first bonding surface has a slope that is less than a slope of a side of the rib groove locking portion further from the first bonding surface.

14. The battery module of claim 11, wherein the rib groove is recessed in a shape corresponding to the rib groove locking portion.

* * * * *